United States Patent [19]

Coburn

[11] 4,162,643

[45] Jul. 31, 1979

[54] HEAD LOCKING MEANS FOR AUTOMATIC SLITTER SCORER

[75] Inventor: Robert E. Coburn, Warmister, Pa.

[73] Assignee: Molins Machine Company, Inc., Cherry Hill, N.J.

[21] Appl. No.: 814,749

[22] Filed: Jul. 11, 1977

[51] Int. Cl.² ........................ B23D 19/06; B23D 35/00

[52] U.S. Cl. ........................................ 83/499; 83/504; 83/665; 83/700

[58] Field of Search .............. 83/499, 498, 504, 508.2, 83/508.3, 665, 700, 675; 93/58.2 R; 403/5

[56] References Cited

U.S. PATENT DOCUMENTS

| | | | |
|---|---|---|---|
| 3,422,714 | 1/1969 | Van Compel et al. | 83/665 X |
| 3,587,374 | 6/1971 | Stewart | 93/58.2 X |
| 3,886,833 | 6/1975 | Wolferston et al. | 83/499 |
| 4,006,671 | 2/1977 | Ochs | 83/665 X |

*Primary Examiner*—J. M. Meister
*Attorney, Agent, or Firm*—Seidel, Gonda, Goldhammer, Patrick

[57] ABSTRACT

An automatic corrugated paperboard slitter scorer has slitting and scoring heads movable individually or as a group along an expandable shaft by a way of a master shifter. The expandable shaft provides a friction drag to maintain a head in position until all heads are simultaneoulsy locked to the shaft.

14 Claims, 5 Drawing Figures

HEAD LOCKING MEANS FOR AUTOMATIC SLITTER SCORER

BACKGROUND

Automatic slitter scorers which include either a computer or miniprocessor have been proposed heretofore. See U.S. Pat. Nos. 3,651,723 and 4,010,677. Other prior art directed to automated slitter scorers include U.S. Pat. Nos. 3,961,547; 3,646,418; 3,831,502; and 3,587,374. In such slitter scorers, heads are moved along a shaft to a predetermined position and then are secured to the shaft for rotation therewith. It is known to simultaneously couple the shaft to all of the operative heads as per U.S. Pat. Nos. 3,951,024 and 4,006,671 instead of coupling each head individually to the shaft.

One problem with the prior art is inadvertent shifting of heads predisposed along a shaft due to vibration or the like prior to the heads being fixedly secured to the shaft. The problem is not solved by simultaneously expanding a portion of the shaft into locking engagement with the heads as taught by U.S. Pat. Nos. 3,951,024 and 4,006,671. Thus, the last two mentioned patents do not take into consideration inadvertent shifting of a head prior to the time when all heads are purportedly in their desired position and then simultaneously coupled to the shaft.

The present invention solves the above-mentioned problems of the prior art as well as other problems which will be made clear hereinafter.

SUMMARY OF THE INVENTION

The present invention includes a shaft or a pair of parallel shafts with a plurality of heads on the shafts. A means is provided for selectively positioning the heads at preselected locations along their shafts. A retaining means and a lock means are provided on each of the shafts. The retaining means is a selectively adjustable friction drag surface which contacts the heads on its associated shaft to prevent inadvertent movement of the heads relative to the shaft. A means is provided for adjusting the radial distance of the outer periphery of the drag surface relative to the longitudinal axis of the shaft.

The positioning means includes a master shifter guided for movement along a path parallel to the longitudinal axis of said shaft or shafts. A drive means is provided for moving the master shifter along said path. The master shifter supports at least two selectively operable fingers for selectively coupling opposite sides of the master shifter to one of the heads. The drive means is capable of providing sufficient force to overcome the effect of the drag surface on said heads while said drive means moves the master shifter longitudinally along its path.

It is an object of the present invention to provide an automatic slitter scorer with means for retaining heads in any predetermined position along a shaft to prevent inadvertent movement of the head prior to all heads being simultaneously locked to the shaft.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
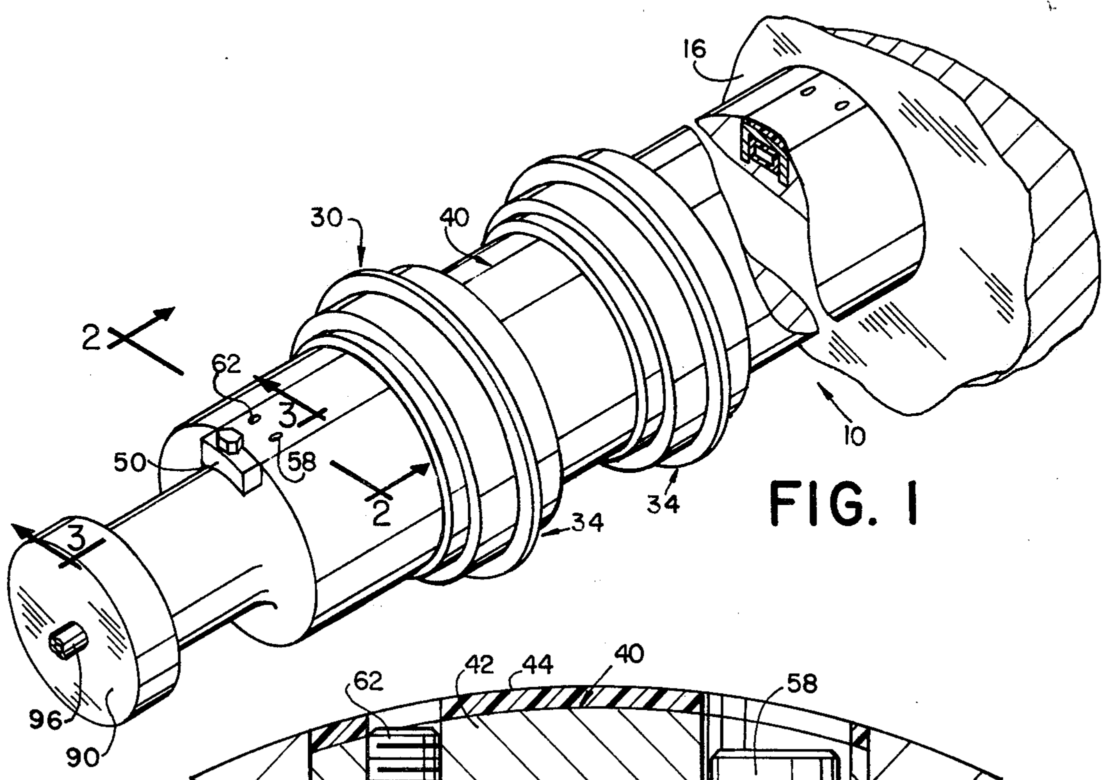
FIG. 1 is a partial perspective view of a shaft having heads thereon.

Referring to the drawing in detail, wherein like numerals indicate like elements, there is shown in FIG. 1 a portion of a slitter scorer in accordance with the present invention designated generally as 10. The slitter scorer 10 is conventionally positioned between the discharge end of the rotary shear and the inlet end of the cut-off.

A web such as a web of corrugated paperboard is supported as it moves from the discharge end of the rotary shear to the apparatus 10 by way of a web table.

Frame 16 supports the ends of an upper head support shaft 30 and a lower head support shaft 32 which are parallel to one another and horizontally disposed. Each of the shafts 30, 32 has a plurality of slitting heads or scoring heads or a mixture thereof thereon. Thus, for purposes of illustration, shaft 30 has slitting heads 34 thereon. Shaft 32 has an equal number of mating heads.

Figure 2:
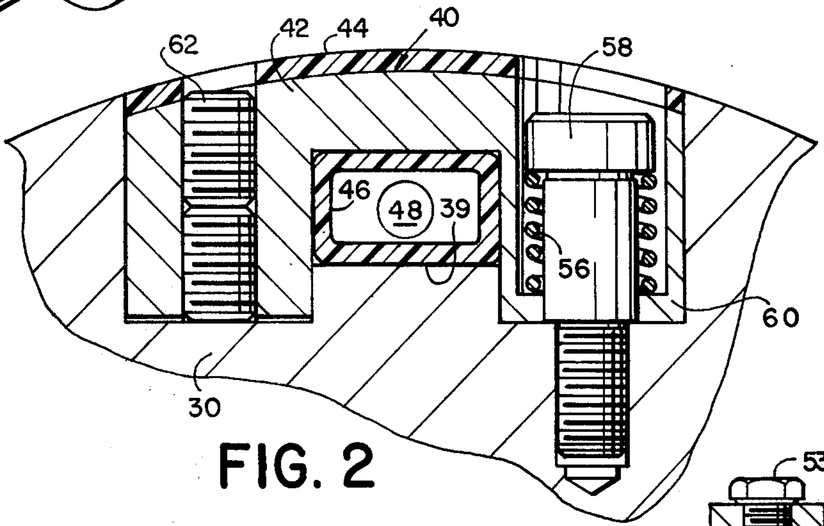
FIG. 2 is an enlarged sectional view taken along the line 2—2 in FIG. 1.
Figure 3:
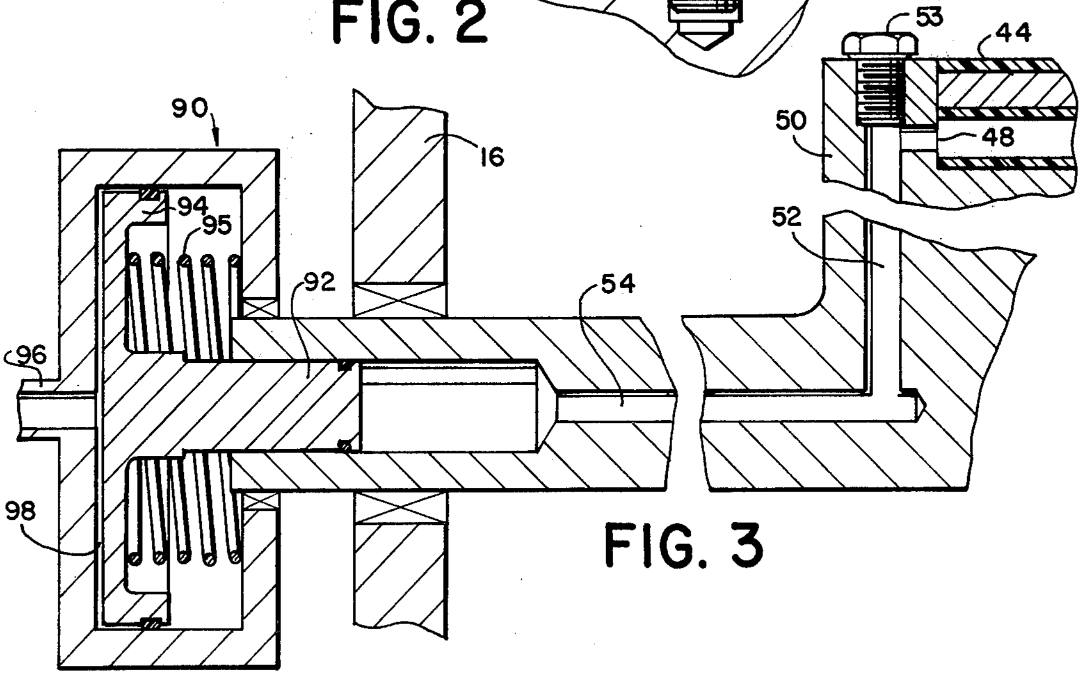
FIG. 3 is an enlarged sectional view taken along the line 3—3 in FIG. 1.

The shafts 30 and 32 are constructed in a similar manner. Hence, only shaft 30 will be described in detail. Referring to FIG. 2, it will be noted that shaft 30 has a longitudinally extending groove 38 which is occupied by a retaining and lock means 40. The base of the groove 38 is formed of three parallel surfaces, the center one forming a ridge portion 39 above the two adjoining surfaces. The retaining means 40 is piloted by the sides of the ridge portion 39 for reciprocal radial movement.

Means 40 includes a metal insert body 42 disposed within the groove 38. The outer periphery of the body 42 is provided with a covering 44 of a suitable material such as polyurethane or some other polymeric plastic material which is an elastomer having good memory. A tube 46, preferably rectangular in cross section, is disposed between the ridge portion 39 in the groove 38 and a recess in the body 42. Tube 46 is closed at one end and has an inlet port 48 at its other end.

The inlet port 48 of the tube 46 communicates with a flow passage 52 in shaft 30. A header 50 containing an air bleed valve 53 is secured to an end face of a reduced diameter portion of the shaft 30. Passage 52 is connected to a supply and exhaust conduit 54. Tube 46 is made from an elastomeric material such as rubber whereby it will expand when inflated by a pressurized motive fluid such as air or an oil.

The body 42 is spring biased radially inward by spring 56. Spring 56 extends between a cap screw 58 and a shoulder 60 on the body 42. The spring 56 surrounds a shank on the screw 58. Screw 58 is threaded into a tapped hole in the shaft 30. The minimum radial position of the means 40 is adjustably determined by a set screw 62 carried by the body 42. Set screw 62 can be threaded inwardly so as to bottom against a surface on the bottom of groove 38. It will be appreciated that the screw 48 and set screw 62 are disposed within drilled holes in the insert body 42 adjacent opposite ends thereof.

A master shifter 64 is guided for movement along the path parallel to the longitudinal axis of shafts 30, 32 by way of rods 66, 68 which extend between the frames 16. The master shifter 64 is propelled along the rods 66, 68 in opposite directions in any suitable manner such as by way of a threaded rod 70 threadedly coupled to the master shifter 64 and driven by one of motors 73, 75 having clutch 79 therebetween. Motor 73 is a large high speed motor such as 1 Hp for moving master shifter 64 at a high speed such as 10 cm/sec which motor 75 is a small motor such as ¼ Hp for moving shifter 64 at a slow rate such as 0.6 cm/sec. Encoder 81 on rod 70 is coupled to the computer which in turn is coupled to clutch 79. Per se, such clutch, computer and motors are well known in the art.

The master shifter 64 has legs 72, 74 depending therefrom so that each of the shafts 30, 32 is disposed between said legs 72, 74. Fingers 76 and 78 are supported by the legs 72, 74, respectively on opposite sides of the shaft 30 for shifting heads along the shaft 30. Likewise, fingers 80, 82 are supported by the legs 72, 74, respectively on opposite sides of the shaft 32 for shifting heads therealong. As the master shifter 64 moves along its guide rods 66, 68, it may cause the heads on shafts 30 and/or the heads on shaft 32 to be shifted along their respective shafts depending upon the position of the fingers 76–82.

Figure 4:
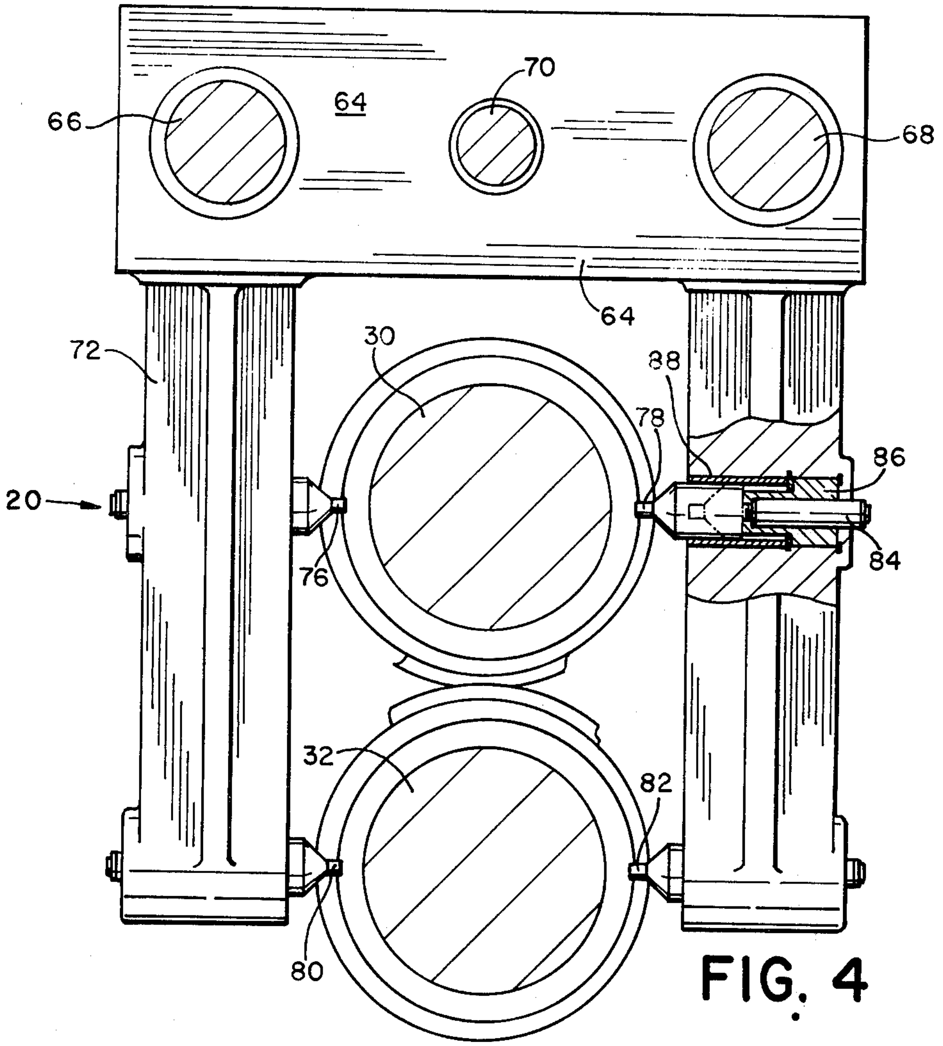
FIG. 4 is a sectional view taken along the shaft with a portion of the master shifter being broken away for purposes of illustration.
Figure 5:
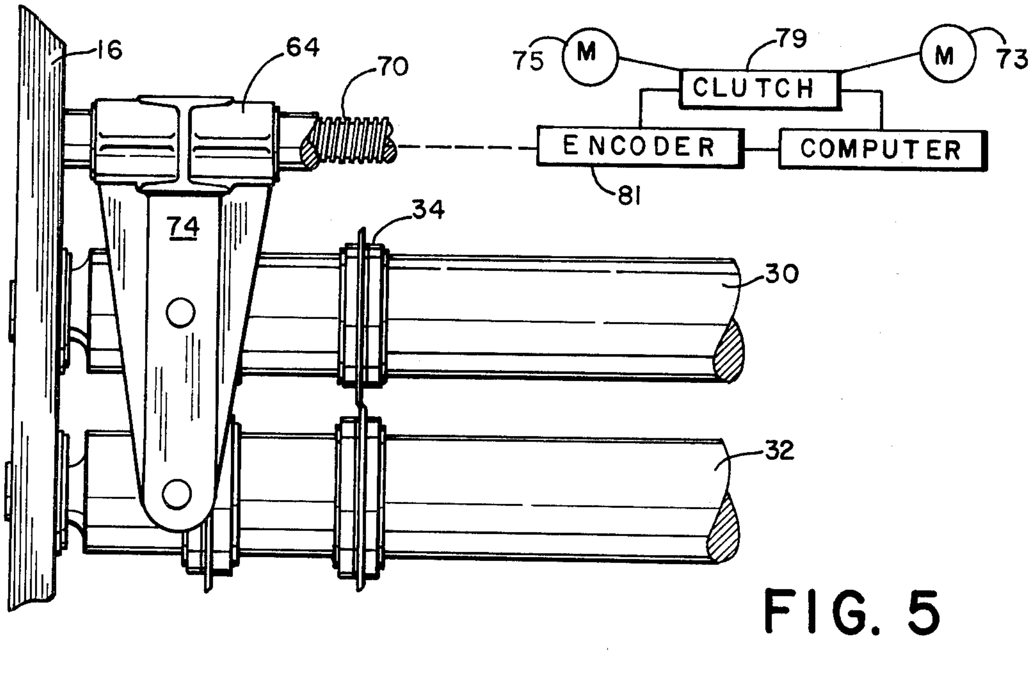
FIG. 5 is a side elevation view of the structure shown in FIG. 4.

The fingers 76–82 are shown in FIG. 4 in their operative position. Since all of the fingers are identical, only finger 78 will be described in detail. The inoperative position of finger 78 is shown in phantom in FIG. 4. A motor such as a pneumatic cylinder is supported by the legs 74 to move the finger 78 between its operative and inoperative positions.

A pneumatic cylinder 84 is supported by a cylinder support 86 which in turn is secured within a portion of a transverse bore in the leg 74. The remainder of the bore is occupied by sleeve bearing 88. A piston rod interconnects a piston within cylinder 84 and the finger 78. The finger 78 has a cylindrical skirt which is guided by the bearing 88 and partially surrounds the cylinder 84 in the inoperative position of the finger 78. In this manner, the finger 78 can have a stroke of 1 to 1½ inches when moved between its operative and inoperative positions. The fingers 76–82 engage a side face of the heads when they move the heads along their respective shafts. While the motor for the fingers is preferably a pneumatic cylinder, other equivalent devices such as a solenoid may be utilized.

Conduit 54 disposed along the axis of shaft 30 is connected to a pressure intensifier 90 having a first piston 92 and a coaxial second piston 94. Piston 94 is substantially larger in diameter than piston 92. I prefer to make piston 94 about four times as large as piston 92 so as to cause piston 92 to transmit a force 16 times as great as the force applied to piston 94. Pistons 92, 94 are biased away from passage 52 by spring 95. Passage 96 communicates with chamber 98 for selectively supplying motive fluid of sufficient pressure to overcome the bias of spring 95 and cause piston 92 to intensify the pressure of the hydraulic fluid used to expand tube 46.

The general sequence of events for changing the position of the heads 34 is as follows. Tube 46 is exhausted. The master shifter 64 moves from one end of the shaft 30 to the other so that all of the heads are moved to one end of the shaft 30.

The fingers 76–82 on the master shifter 64 are then retracted. Thereafter, the master shifter 64 moves and distributes the heads 34 to the new position for the next production order.

As the master shifter 64 moves, it pushes all of the heads in front of it until the last head reaches its predetermined position. At that point, the master shifter stops and the fingers 76–82 are retracted. Then the master shifter moves forward through a distance corresponding to the thickness of the last head at which point the fingers are then extended. Thereafter, the master shifter 64 continues to push the remainder of the heads until the then existing last head reaches its predetermined position. The sequence is then repeated until all of the operative heads have been disposed along their predetermined position. The remaining heads in front of the master shifter 64 are then pushed to one side and will remain operative. Thereafter, tube 46 is expanded to lock the heads.

The slitter heads 34 are maintained in their predetermined position due to the frictional drag between the covering 44 and the inner diameter of the heads. Thus, the set screws 62 will be adjusted so as to cause the covering 44 to project beyond the periphery of the shaft 30 for a sufficient distance such as 0.002 to 0.01 inches so as to maintain any slitter head in a predetermined position as deposited by the master shifter 64. A liquid such as oil is pressurized by piston 92 and is introduced into tube 46 at a high pressure such as 1,000 psi to cause the tube 46 to expand against the pressure of springs 56 and simultaneously lock all of the heads to their respective shafts. In its collapsed and in its expanded position, the tube 46 is completely encased and confined by mutually perpendicular walls of body 42 and groove 38. My preferred locking pressure is 625 lbs/linear inch of body 42. Means 40, by way of covering 44, maintains any slitter head or cutter head in a predetermined position so as to prevent inadvertent movement of the same prior to all of the heads being simultaneously locked to their shaft.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus including a shaft, a plurality of heads slideable along said shaft, means for selectively positioning said heads in predetermined locations along said shaft, the improvement comprising:

(a) an elongated expandible chamber means extending along the central portion of said shaft for simultaneously locking all heads to said shaft when said chamber means is pressurized and a friction drag surface projecting in a radial direction with respect to the periphery of said shaft for a predetermined distance into contact with said heads, (b) means independent from said chamber means to prevent inadvertent movement of the heads relative to the shaft when said chamber means is unpressurized including means for adjusting the radial distance of the outer periphery of said drag surface relative to the longitudinal axis of said shaft so that said drag surface may project beyond the periphery of said shaft while said chamber is unpressurized.

2. Apparatus in accordance with claim 1 wherein said chamber means is a tube having conduit means to facilitate introduction of a pressurized motive fluid.

3. Apparatus in accordance with claim 2 wherein said tube is disposed between a portion of said shaft and said retaining means, and spring means biasing said surface radially inwardly of said shaft.

4. Apparatus in accordance with claim 1 wherein said adjusting means includes a plurality of set screws threaded to a body supporting said surface, one end of each set screw being in contact with a surface of said shaft.

5. Apparatus in accordance with claim 2 wherein said tube is rectangular in cross section and encased by mutually perpendicular surfaces in its expanded and contracted positions.

6. Apparatus in accordance with claim 1 including a master shifter supported for movement parallel to said shaft and having means thereon for contacting said heads so that the heads may be moved along said shaft with sufficient force to overcome the drag effect of said drag surface.

7. Apparatus in accordance with claim 1 wherein said locking means includes a fluid pressure intensifier comprising a first piston for generating fluid pressure in said chamber means, and a second piston coaxial with and joined to said first piston, said second piston having substantially greater area than said first piston so that a unit fluid pressure exerted by said second piston produces a proportionally higher unit pressure output by said first piston.

8. Apparatus in accordance with claim 7 wherein said fluid is non-compressible and said pressure exerting means is compressed air.

9. Apparatus having a shaft, a plurality of heads slideable along side shaft, means for selectively positioning said heads in predetermined locations along said shaft, the improvement comprising:

(a) a friction drag surface projecting in a radial direction with respect to the periphery of said shaft for a predetermined distance into contact with said heads, means for adjusting the radial distance of the outer periphery of said drag surface relative to the longitudinal axis of said shaft, spring means biasing said drag surface radially inwardly, (b) locking means including an expandible chamber extending along said shaft radially inwardly of said drag surface for simultaneously locking all heads to said shaft by expanding said chamber to move said drag surface radially outwardly in opposition to said spring biasing means.

10. Apparatus in accordance with claim 1 wherein said drag surface is a layer of polymeric plastic material.

11. In a slitter scorer having a shaft, a plurality of heads, slidable along said shaft, for processing a running web, means for selectively positioning said heads in predetermined longitudinal locations, the improvement comprising:

head locking means extending longitudinally in a groove in said shaft, said head locking means including an expandible tube containing a fluid for simultaneously locking all heads to said shaft upon pressurization of said fluid, means connected to said tube for selectively pressurizing said fluid, and means independent of said locking means for adjusting the minimal radial distance of the outer surface of said locking means so as to frictionally impede inadvertent longitudinal movement of said heads when said tube is unpressurized.

12. An improved slitter scorer machine having a frame, at least one transverse shaft supported in the frame for driving a plurality of heads slidable therealong, the improvement comprising:

(a) a head locking means in said shaft movable relative to the periphery thereof for restraining movement of the heads;

(b) the periphery of said shaft having a longitudinal groove for retaining said locking means;

(c) the base of said groove comprising at least three parallel sufaces, the center one of said three surfaces forming a portion elevated relative to the two adjacent parallel surfaces;

(d) the inner side of said locking means having a median groove of greater depth than the elevation of said central portion in the groove of said shaft to form thereby a chamber;

(e) said median groove having a width adapted for sliding contact with the two surfaces dependent from said elevated central portion;

(f) an expandible tube extending longitudinally within said chamber;

(g) means for resiliently urging said locking means inward toward the bottom of the groove in said shaft;

(h) a source of pressurized fluid for selective application to said expandible tube for urging said locking means radially outward; and (i) means for limiting the inward movement of said locking means so that the outer surface of said locking means exerts a retarding force on the bore of said heads when said tube is not affected by the pressurized fluid.

13. Apparatus in accordance with claim 12 wherein said limiting means includes a plurality of set screws threaded in said locking means, one end of each of said set screws being in contact with a surface of said shaft.

14. Apparatus comprising:

a shaft, a plurality of heads slideable along said shaft, said shaft having a longitudinally extending peripheral groove, a rigid metal body disposed within said groove and guided by said groove for movement in a radial direction, a covering having an exposed friction drag surface fixedly secured to the outer periphery of said body, spring means biasing said body radially inwardly, expandible chamber means carried by said shaft radially inward of said body and coupled to said body for moving said body and drag surface radially outwardly into locking contact with each of said heads when said chamber means is pressurized, adjustable means carried by said body and in contact with said shaft for adjusting the radial distance of said friction drag surface relative to the longitudinal axis of said shaft so that said drag surface may project beyond the periphery of said shaft while said expandible chamber means is unpressurized.

* * * * *